July 25, 1944. G. H. GILL 2,354,371
OIL COOLER CONTROL
Filed June 6, 1942 2 Sheets-Sheet 1
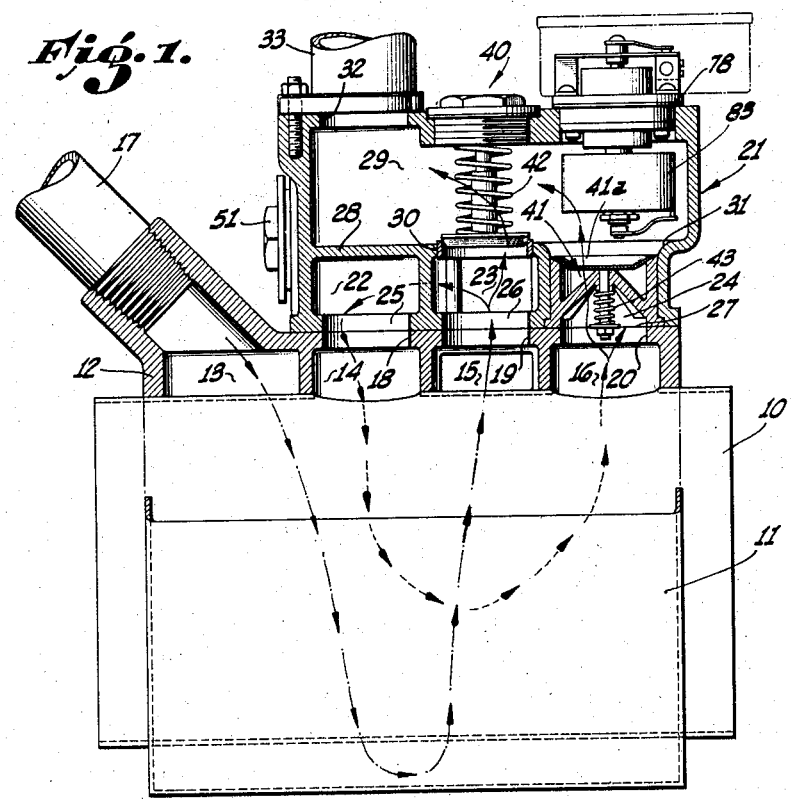
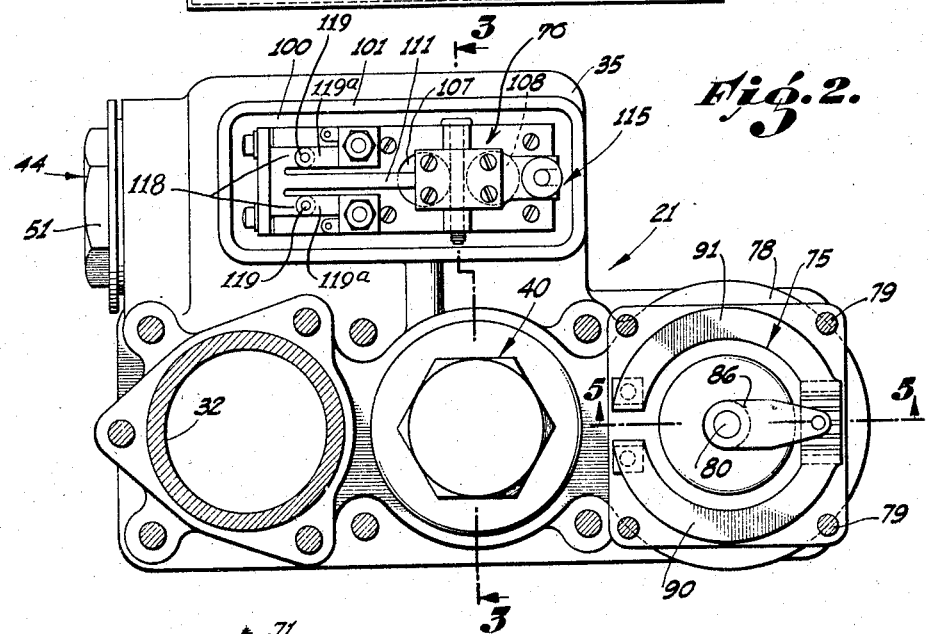
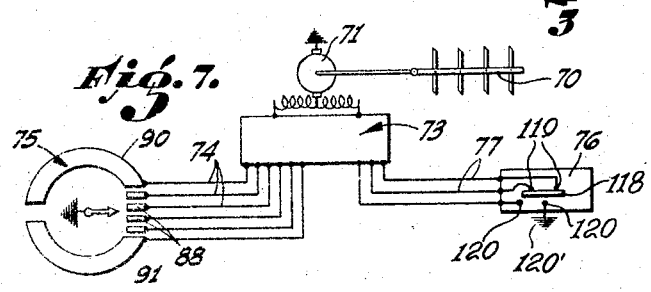
GEORGE HERBERT GILL,
INVENTOR
BY
ATTORNEY July 25, 1944.  G. H. GILL  2,354,371
OIL COOLER CONTROL
Filed June 6, 1942  2 Sheets-Sheet 2
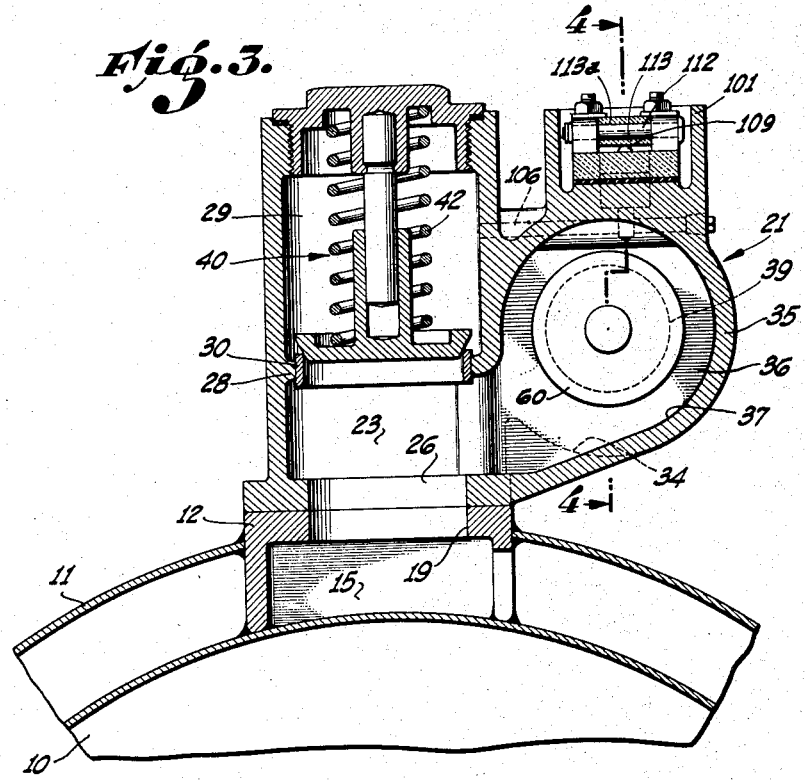
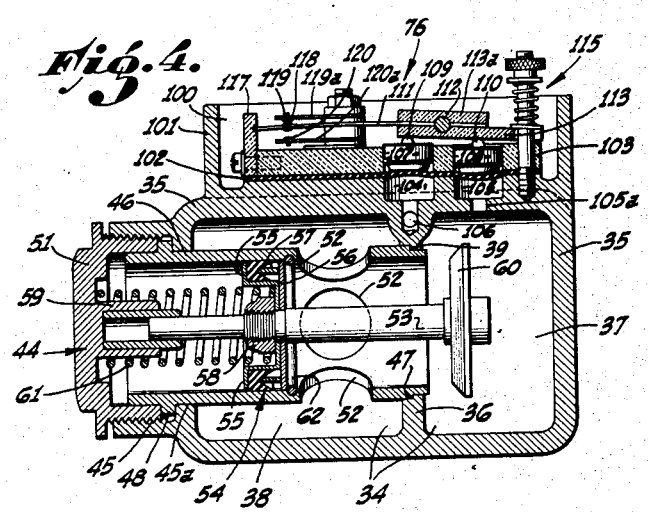
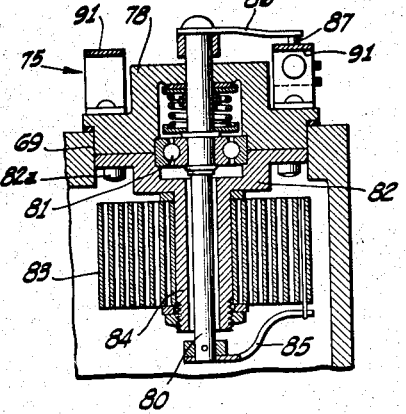
GEORGE HERBERT GILL,
INVENTOR
ATTORNEY Patented July 25, 1944

2,354,371

UNITED STATES PATENT OFFICE 2,354,371

OIL COOLER CONTROL

George Herbert Gill, Manhattan Beach, Calif., assignor to The Garrett Corporation, Airesearch Manufacturing Company division, Inglewood, Calif., a corporation of California Application June 6, 1942, Serial No. 446,104

3 Claims. (Cl. 257—2)

This invention relates in general to oil cooling systems for internal combustion engines, and relates in particular to a cooling system having unitary protection and control means for protecting the heat exchanger of the system from the destructive effects of excessive pressure or pressure surges in the oil circulating system associated therewith, and for regulating the cooling action of the cooler.

Oil coolers of the type now generally employed for aircraft installation comprise a cooler proper, or heat exchanger, a means for regulating the cooling action of the cooler, and a control for the regulating means which acts to provide an uninterrupted flow of oil at a predetermined optimum temperature from the cooler to the aircraft engine. The heat exchanger is an oil container, often in the shape of a cylindrical drum, through which oil passes from an oil inlet to an oil outlet in heat exchange relation with metal tubes within the drum, through which atmospheric air is passed by the action of the aircraft propeller, or in consequence of the motion of the aircraft through the atmosphere.

The heat exchanger may include an oil jacket or muff for the cooler drum through which oil, as it comes from the engine, may be passed to warm the core or cooler proper.

The means for regulating the cooling action of the cooler usually consists of shutters, a flap, or other air stream controlling means which may be adjusted in position with respect to the direction of the flow of air for varying the flow rate of air through the core tubes, and an actuating means for giving them the adjusting movements. Thus, the temperature of the oil leaving the cooler is regulated, the absorption of heat from the oil into the air stream varying with the position of the shutters or flap.

The operation of the regulating means is usually controlled by a thermostat responsive to the temperature of the oil or a device responsive to the pressure drop within the cooler, the pressure drop being a measure of the viscosity of the oil which is a variant of its temperature. One type of control of this regulating means involves a thermostatic device responsive to the temperature of the oil leaving the cooler and an overriding control responsive to the pressure drop between the cooler terminals which will act when this pressure drop becomes excessive due to congealing of the oil on the air tubes or due to high viscosity of cold oil within the cooler core.

The heat exchanger, both the core or cooler proper, and the associated warming jacket or muff, if such be used, are subject at times to heavy oil pressures in both the hot oil delivery piping and cooled oil return piping and to heavy oil pressures developed within the cooler proper under certain operating conditions. Protective valves are therefore desirable to prevent these unduly high pressures from mechanically damaging the parts of the cooler, especially the core, which is of light structure.

One object of this invention is to so combine valve means for protecting the cooler parts from excessive pressures and regulatory means for controlling the cooling action of the cooler that each will properly perform its function in harmonious cooperation with the other protective and regulatory means.

It is another object of the invention to provide in a cooling device in which the oil passes first through a warming jacket around the cooler proper and then through the core, a thermostat which will be responsive to the temperature of the oil immediately prior to its passage into the cooled oil return piping, so that its controlling action may be correlated with the rate of heat transfer of both the core and the muff.

It is another object of the invention to provide in a cooling device in which the muff and core are arranged in series in the path of the oil, a control means responsive to the pressure drop between the terminals of the core only, rather than between the inlet of the muff and the outlet of the core. If the means responsive to pressure drop is connected to be sensitive to the pressure drop between the muff inlet and the core outlet, and adjustment of the shutter mechanism of too great a magnitude or a premature adjustment thereof may result, warming the oil more rapidly than may be necessary to return it to its normal or optimum value.

It is also an object of the invention to provide in a cooling device, comprising a muff connected in series with the cooling core and comprising a bypass passage for the core which is also arranged in series with the muff, a control means for the regulatory operation of the shutters which shall be responsive to the pressure drop between the terminals of the bypass or the terminals of the core to the exclusion of any pressure drop in the muff which may be substantial when the oil in the cooling system is at a low temperature after a period when the aircraft engine has been out of operation.

Another object of the invention is to provide a fiting or unit for housing the protective valve devices and control devices for the shutters of simple design, upon which the valve and the control devices may be readily installed and be readily accessible for replacement or repairs.

It is another object of the invention to provide an electrically operating regulating means for controlling the cooling action of the refrigerant within the cooler and a thermostatically controlled switch for the electrical operating means which will make several correlative adjustments of the refrigerant control means in response to temperatures within a range which deviates but slightly from normal temperature and a single more extreme adjustment for all temperatures above that range, and another single oppositely more extreme adjustment for all temperatures below that range.

It is also an object of the invention, in a switch device for fulfilling the purpose set forth in the last paragraph, to provide a construction and relationship of parts which shall afford simplicity, sturdiness, and durability.

In the drawings and description, which follow, one embodiment of the invention is disclosed.

Referring to the drawings which are for illustrative purposes only,

Fig. 1 is an elevational view of a cooling device embodying the invention, showing the protective and control unit in vertical section.

Fig. 2 is an enlarged top plan view of the protective and control unit with the covers for the control device removed.

Fig. 3 is a section taken as indicated by the line 3—3 of Fig. 2.

Fig. 4 is a section taken as indicated by the line 4—4 of Fig. 3.

Fig. 5 is a section taken along the line 5—5 of Fig. 2, showing the thermostatically operated switch for controlling the means for regulating the shutters, some of the adjacent portions of the fitting being shown therewith.

Fig. 6 is an end elevational view of the parts shown in Fig. 5.

Fig. 7 is a schematic view showing the shutters for regulating the cooling action of the refrigerant air, the means for operating the shutters and the control mechanism therefor.

As shown in Fig. 1, a drum or core 10 is surrounded by a warm up reservoir or muff 11. The core is comprised of refrigerant air tubes (not shown) around which the oil is caused to circulate by means of suitably disposed baffle plates (not shown). The upper ends of the muff 11 are spaced apart to receive a fitting 12, the walls of which are formed to provide four chambers 13, 14, 15, and 16. Chamber 13 forms a communicating connection between the hot oil delivery pipe 17 and one end of the muff 11. The chamber 15 receives oil from the other end of the muff. The chambers 14 and 16 communicate with the inlet and outlet openings respectively of the core 10. The upper wall of the fitting 12 is formed with ports 18, 19, and 20 for the chambers 14, 15, and 16 respectively.

A protective control unit generally designated by the numeral 21 comprises a housing having exterior and suitably located partition walls to provide a row of chambers 22, 23, and 24 having ports 25, 26, and 27, registering with the ports 18, 19, and 20 respectively of the chambers of the fitting 12. Between a horizontal partition wall 28 and the upper wall of the protective unit lies the chamber 29 extending across and above all three of the chambers 22, 23, and 24. The chamber 29 communicates with the chambers 23 and 24 below it through the ports 30 and 31 respectively in the wall 28. Oil in the chamber 29 is returned to the engine through the port 32 and the cooled oil return piping 33.

The chambers 23 and 22 are connected at their rear sides by a communicating passage 34, as shown in Fig. 4. This passageway is provided by means of a chambered rearwardly extending projection 35 of the housing 21. The passageway 34 is divided by a partition wall 36 of the housing into an inlet chamber 37 and an outlet chamber 38 connected by a circular opening 39 in the wall 35.

Flow of oil from the muff through the chambers 15 and 23 to the chamber 29 is controlled by a check valve assembly 40, mounted in the upper wall of the housing 21, and weighted by a spring 42. Outward flow of oil from the core 10 through the chambers 16 and 24 to the chamber 29 is controlled by a check valve assembly 41, the frame structure of which is seated in the chamber 24 below the port 31. The valve 41a of this check valve assembly 41 closes the port 31 to the passage of oil into the chamber 24 from the chamber 29 when acted upon by a reverse pressure drop between these two chambers. It is weighted by a relatively light spring 43 which permits the valve 41a to allow outward flow of oil whenever there is any appreciably greater pressure in the chamber 24 with respect to the chamber 29, but which will assist any reverse pressure drop between these two chambers in closing the valve 41a.

Flow of oil through the passageway 34 from the muff and chambers 15 and 23 to the chambers 22 and 14 and thence into the oil core 10 is controlled by a valve assembly insert 44, which is shown in Fig. 4 of the drawings. The side wall of the housing 21 has an opening 45 through which the valve assembly insert 44 may be installed.

The valve assembly has a cylindrical member or valve cage 46 which, with its associated parts, is inserted through the opening 45, its inner end fitting within the opening 39 in the wall 36 and its outer end portion snugly engaging a portion 45a of reduced diameter of the opening 45. The inner end of the cage 46 is step shouldered at 47 for abutting engagement with a correspondingly formed shoulder in the opening 39 to limit inward movement of the cage and form a fluid tight joint with the wall 36. The outer end portion of the cage 46 is formed with an annular flange 48 which similarly engages the outer wall of the reduced portion 45a of the opening 45. The valve cage 46 is held in position by a nut 51 which has threaded engagement with the bore of the opening 45 and which also serves as a protective cover for the parts of the valve assembly 44.

The valve cage 46 has, adjacent its inner end, ports 52 through which oil may flow from the interior chamber of the valve cage into the chamber 38. A valve stem 53 has mounted upon it a piston 54 which may reciprocate in sliding engagement with the bore surface of the valve cage 46. This piston may be of any suitable design and may be secured to the valve stem in any suitable manner. As shown in the drawings, it comprises a cup 55, a washer 56, and packing 57 held between the cup and washer and it is secured to the valve stem by means of a nut 58 threaded upon the stem and arranged to clamp the cup and washer against a stepped shoulder on the valve stem.

A centrally bored inwardly extending boss 59 of the end nut 51 serves as a guide for the outer end of the valve stem 53. The inner end of the valve stem 53 carries a valve 60 which may be moved outwardly when oil pressure upon the inner face of the piston 54 causes the piston and valve stem to move outwardly against the pressure of a spring 61, which engages the nut 51 and the outer face of the piston 54 at its respective ends. An outward movement of the piston under the pressure of oil causes the valve 60 to engage the inner end of the valve cage 46 which forms a valve seat for the valve 60. A ring 62 of spring wire limits inward movement of the piston 54 and valve 60.

The oil from the engine enters the muff 11 from the hot oil delivery piping 17 through the chamber 13 in the fitting 12 and after passing through the chamber of the muff or completely around the drum 10, is delivered to the protective unit 21 through the chamber 15 of the fitting 12 through the ports 19 and 26. The spring 61 associated with the valve structure 44, Fig. 4, is of such strength that it will resist outward movement of the piston 54 against the fluid pressure in the chambers 23 and 37 somewhat greater than the normal operating pressure of the circulating system but considerably less than the maximum safe working pressure of the core 10. Should heavy pressure be built up in the chambers 23 and 37, such pressure will be transmitted to the inner face of the piston 54, causing the piston 54 to move outward or leftward against the force of the spring 61. Th valve 60 will be thereby moved toward the inner end of the valve cage 46, and as the valve 60 approaches the valve seat formed by the inner end of the cage, the friction of oil passing through the reduced space between the valve periphery and the valve seat, together with the pressure exerted against the rightward face of the valve 60, will move the valve 60 into contacting engagement with the valve seat, thereby cutting off communication between the muff and the core 10. This closing of the valve 60 occurs when a prescribed increase in pressure is developed in the hot oil delivery piping and muff. The pressure of fluid thereafter delivered through the hot oil piping 17 may increase dangerously above the safe working pressure of the core, but since the valve 60 is closed it cannot be transmitted through the passageway 34 to the cooling chamber within the core 10.

The spring 42 of the check valve structure 40 between the chamber 23 and the outlet chamber 29 is gauged so that the valve thereof will yield from its position, opening the port 30 at a pressure slightly greater than the pressure required for the closing of the piston controlled valve 60. Accordingly, closing of the valve 60 does not act to stop the flow of oil through the oil circulating system, but the oil may then pass directly from the delivery piping 17 through the port 30 into the chamber 29 and return piping 33, bypassing the core 10 and returning directly to the engine.

The spring 43, associated with the check valve structure 41, will yield upwardly, opening the port 31 in response to a relatively small pressure drop between the chambers 24 and 29. On the other hand, any increase in pressure in the chamber 29 above that in the chamber 24, however slight, will allow the spring 43 to close the port 31, giving assurance that when a high pressure surge is transmitted to the chamber 29 from the return piping, the valve of the check valve structure 41 will close the port 31, protecting the oil cooler against destructive pressures existing at any point beyond the outlet port 32 of the protective and control unit 21.

The check valve structure 40 has the dual purpose of opening a bypass for the oil around the core when, due to a high pressure in the delivery piping system or due to stoppage within the core, it is of advantage to break the connection between the delivery piping system and the core, and also of protecting the muff from excessive oil pressure in the return piping.

The core is protected from high pressure in the delivery piping by the valve assembly 44 and by high pressure in the return piping by the check valve structure 41.

A dual control system for the operation of the means for regulating the cooling action of the cooler is schematically shown in Fig. 7. The rate of flow of the air stream through the cooler is varied by adjusting the position of the air shutters 70. The movement of adjustment is effected by a reversible motor 71 which may be operated for different periods of time in either direction through the action of a control apparatus, generally indicated by the numeral 73, which may comprise interrelated relay switches and other devices. The control apparatus 73 is connected by electrical conductors in a cable 74 to contact terminals in a switch mechanism 75. It is also connected by electrical conductors in a cable 77 to an overriding pressure drop actuated control device 76. The detailed description of such a control system for operation of air shutters or an air flap is shown and described in United States Letters Patent No. 2,314,937, granted March 30, 1943, to Andrew L. Hannon, for Control device for oil coolers, and since the details of construction of the several parts of the control system and their relationship to each other are not a part of this invention, the system is herein described by reference to its general character and method of operation, which may be defined as follows.

The control apparatus 73 energizes the motor 71 selectively to adjust the shutters 70 to any one of a number of predetermined positions, corresponding to the positions of the movable element of the switch mechanism 75, subject, however, to the overriding action of the pressure drop control device 76.

Considering first the switch mechanism 75, the construction of which is shown in Figs. 5 to 7 of the drawings, a housing block 78 of insulating material is secured in an aperture 69 in an exterior wall of the chamber 29 of the unit 21. This aperture is aligned with the chamber 24 and its port 31, affording convenience of access to the check valve structure 41 if the switch mechanism 75 be removed from the unit. The housing block 78 is fastened to the unit by means of screws 79. A shaft or spindle 80 is rotatably mounted in the bearing 81 which is clamped in position between the housing block 78 and a bottom plate 82 secured to the housing block by screws 82a. A helically formed thermostat 83 has its dead end secured to a downwardly projecting tubular extension 84 of the plate 82 and its free end to a radial arm 85 carried by the lower end of the spindle 80.

To the upper end of the spindle 80, which projects above the upper fact of the housing block 78, is fixed a brush arm 86 carrying on its outer end a brush contact 87 which, as the spindle is oscillated, engages an arcuate row of contacts 88, 90, and 91.

The contacts 88 are relatively short circumferentially of the arcuate path of the brush 87 and are electrically insulated from each other by plates 89 of dielectric material. The contacts 88 occupy therefore a relatively short section of the arc of travel of the brush 87, which section is approximately central with respect to the range of movement of the free end of the thermostat 83.

Contacts 90 and 91 are much longer than any of the contacts 88 or than the group of contacts 88 and spacers 89, each of the contacts 90 and 91 engaging the brush 87 when the free end of the thermostat 83 is at any point along an extended range of movement on the two sides respectively of the range of movement corresponding to the group of short contacts 88.

The contacts 88 are mounted on a bar 95 which is, in turn, supported on the housing block 78 by means of brackets 92. The bar 95 is also the mounting means for the inner ends of the long contacts 90 and 91, which are insulated from the adjacent contacts 88 by one of the insulating plates 89. The outer ends of the long contacts 90 and 91 are formed with downwardly turned extensions which are secured to the housing block 78.

A box shaped cover 96 is positioned to enclose and protect the exposed parts of the switch mechanism 75. The short contacts 88 and the long contacts 90 and 91 are connected by wires in the cable 74 to the motor control apparatus 73, and the brush contact 87 has a ground connection therewith.

The motor control apparatus 73 is so designed that for each different position of the brush 87 with respect to the contacts 88, 90, and 91, the shutters 70 will be caused to assume a corresponding position. The relative arcuate lengths of the contacts 88, 90, and 91 is one of the features of this invention. When the brush 87 is traveling under the action of the thermostat 83 in the central portion of its range of movement, the shutters are caused to assume corresponding positions. A small change in temperature of the oil in the chamber 29 is reflected in a corresponding small change in position of the shutter 70, tending to return the temperature of the oil to its normal value. But after the temperature of the oil drops either above or below the short range of values corresponding to the zone of travel of the brush 87 across the short contacts 88, a corresponding position is taken by the shutters which is but slightly different from the position of the shutters corresponding to the adjacent short contact 88, and no matter how greatly the temperature departs from normal in either direction, and no matter how far the brush travels along the contacts 90 and 91, no further change will result in the position of the shutter 70.

It will be observed that since the thermostat is immersed in oil in the chamber 29, which is disposed immediately ahead of the cooled oil return piping, the thermostatic control of the shutters will be responsive to the temperature of the oil leaving the cooler, irrespective of the position of any of the protective valve devices or of the path of the oil through the cooling device, i. e., whether by way of the core proper or by way of the core bypass passage, and that the temperature to which it is responsive is that resulting from the combined heat transferring action of the muff, the core, and other passages and chambers of both the heat exchanger and protective and control unit. By reason of its position in the chamber 29, it is always responding to the temperature of flowing oil and it is always responding to the temperature of the oil which is being returned to the engine.

The pressure drop control device 76 is housed in a recess 100 formed by the upwardly projecting walls 101 of the rearwardly extending projection 25 of the unit housing 21. The particular construction of the pressure drop device as shown in Fig. 4 of the drawings is not a part of this invention, but it will be described sufficiently to develop its functional relationship to the other parts of the cooling device.

A flexible strip 102 of rubber or similar material is clamped to the upper surface of the housing wall by a plate 103 of electrical insulating material. The strip 102 passes across and divides into upper and lower portions, each of two cylindric chambers 104 and 105 formed in the wall of the unit 21 and in the plate 103. The chamber 104 is in communication with the unit outlet chamber 29 by way of a duct 106. The chamber 105 is in communication with the upstream portion 37 of the passageway 34 by way of a duct 105a. Pistons 107 and 108 provided on their upper surfaces with rounded nibs 109 and 110 respectively, move slidably in the cylindric chambers 104 and 105 respectively in accordance with the fluid pressures upon the under surface of the strip 102 in the lower portions of the chambers 104 and 105.

A rocker leaf 111 is clamped between two insulating plates 113 and 113a, the lower of which rests against the rounded ribs 109 and 110. The assembly of the leaf 111 and the holding plates 113 and 113a can rock about a supporting pin 112 mounted between the side walls of the recess 100. Movement of this assembly is controlled at one end by the spring weighted anchor device 115 and at the other end by a fixed connection between the leaf 111 and an anchor wall 117 of insulated material, which is fastened to the plate 103. The leftward end of the member 111 is formed like a letter T so as to provide a bridging contact 118, which, in raised position, as shown in Figs. 4 and 7, engages contacts 119, and when lowered will engage contacts 120 which are supported directly below the contacts 119. The contacts 119 are supported at the leftward ends of spring arms 119a and the contacts 120 are supported at the leftward ends of spring arms 120a. The various parts of the pressure drop control device 76 which govern the movement of the leaf 111 are so designed that when there is a heavy pressure drop between the chamber 37 and the unit outlet chamber 29, that portion of the flexible strip 102 across the cylindric chamber 105 will move upwardly, rocking the leaf 111 in a counterclockwise direction at its rightward end against the spring action of the anchor device 115, moving the piston 107 and the strip 102 beneath it downwardly, causing a downward snap movement of the leftward end of the leaf 111, bringing the contact 118 on the leaf into electrical engagement with the contacts 120. When the respective pressures in the chambers 37 and 29 are more nearly the same, the spring weighted anchor device 115 will move the piston 108 downwardly, allowing the piston 107 to move upwardly under the influence of the pressure chamber 29, rocking the leaf 111 in a clockwise direction and snapping the contact 118 on the leftward end of the leaf upwardly into electrical engagement with the contacts 119. The parts are so constructed and related that the contact 118 will never be in a neutral position between the contacts 119 and 120 but will always be in engagement with one or the other of these two contacts.

During normal operation of the cooler, the bridging contact 118 rests in engagement with the contacts 119, but when the pressure drop is raised above a predetermined value, the contacts 120 will be bridged by the contact 118 so as to connect the ground 120' with one of the conductors of the cable 77 to move the shutters to a relatively closed position, irrespective of any action which might otherwise be brought about through any particular position of the switch mechanism 75. When, on the other hand, the contacts 118 and 119 are in engagement, a circuit will be established which will permit the operation of the switch mechanism 75 to control the position of the shutters.

In a cooling device constructed in accordance with this invention, the oil from the engine, which is always warm after a few moments following the starting of the engine, passes through the muff in a position of heat exchange relation with the core. This passage of warm oil through the muff is a condition which obtains at all times whether the valve assembly 44 is in open or closed position.

The core is thus subjected to the warming action of the muff whether or not oil is passing through the core. This is a desirable feature of the invention. When the oil flowing through the core is being unduly cooled by the refrigerant, the muff prevents loss of heat from the oil in the core, augmenting the action of the switch mechanism 75 or the pressure drop device 76, as the case may be, in checking the temperature drop and inhibiting formation of waxed oil on the cooler tubes. When the oil passing through the core is at too high a temperature, a portion of the heat passed from the oil in the muff to that in the core is absorbed by the refrigerant air, increasing the temperature of the air to a higher value than would otherwise be the case, the remainder of the heat transferred from the muff to the core causing a rise in temperature of the oil in the core.

I claim as my invention:

1. In an oil cooling system of the class described having hot oil delivery piping and cooled oil return piping, a heat exchange assembly having a cooler with an inlet port and an outlet port, and having a port to receive oil from the delivery piping, said ports being arranged in alignment substantially in the same plane in an upper exterior wall in said assembly, said heat exchange assembly having means for conducting a flow of cooling fluid therein and a means for regulating said flow of cooling fluid, the combination of: walls formed to provide in the lower portion of the fitting a cooler inlet chamber, a cooler outlet chamber, and a delivery piping chamber, said three chambers being aligned in juxtaposition with and having port communication with said inlet port, said outlet port, and said delivery piping port respectively, and formed to provide further an elongated upper chamber above and across said three chambers, a first port and a second port connecting said upper chamber with said delivery piping chamber and said cooler outlet chamber respectively, and a port connecting said upper chamber with said return piping; a laterally projecting wall structure providing in conjunction with said walls, a passageway at the rear of said three aligned chambers connecting said delivery piping chamber with said cooler inlet chamber, and providing a transverse wall in said passageway having a first opening, one end wall of said wall structure being formed with a second opening axially aligned with said transverse wall opening; a spring weighted normally open check valve structure supported in and sealing said second opening for closing said first opening in response to excessive pressure in said passageway; a normally closed check valve structure supported in an opening in the upper wall of said upper chamber for opening said first port in response to excessive pressure in said delivery piping chamber; a normally open check valve structure supported in said cooler outlet chamber for closing said second port in response to a reverse pressure drop across said second port; a thermostat control device for said regulating means supported in an opening in the upper wall of said fitting with its thermostatic element in said upper chamber; and a pressure drop control device for said regulating means to override the action of said thermostat control device, supported in an opening in an exterior wall of said laterally projecting wall structure and having conduit connections with said passageway upstream from said valve therein and with said upper chamber.

2. In an oil cooling system of the class described, having hot oil delivery piping and cooled oil return piping, a heat exchange assembly having a cooler with an inlet port and an outlet port, and having a port to receive oil from the delivery piping, said ports being arranged in alignment substantially in the same plane in an upper exterior wall in said assembly, said heat exchange assembly having means for conducting a flow of cooling fluid therein and a means for regulating said flow of cooling fluid, the combination of: a housing having walls providing a unit inlet chamber for connection to said delivery piping, a cooler inlet chamber for connection to said cooler inlet, a cooler outlet chamber for connection to said cooler outlet, a passageway connecting said cooler inlet and cooler outlet chambers, a unit outlet chamber for connection to said return piping, at least one of the walls of each of said passageway and unit outlet chambers being an exterior wall of said unit, a first port between said unit inlet chamber and said unit outlet chamber, a second port between said cooler outlet chamber and said unit outlet chamber; a check valve structure mounted in an exterior wall of said passageway having a normally open valve for closing said passageway, and a spring weighted piston responsive to excessive oil pressure in said passageway to move said valve to close said passageway; a check valve structure mounted in an exterior wall of said unit outlet chamber having a normally closed relatively heavily spring weighted valve for opening said first port in response to excessive pressure in said unit inlet chamber; a check valve structure mounted in said second port having a relatively lightly spring weighted valve for closing said second port in response to a reversely acting pressure drop between said unit outlet chamber and said cooler outlet chamber; and a thermostat control device for said regulating means supported in an exterior wall of said unit outlet chamber opposite said second port with its thermostatic element in said unit outlet chamber 3. In an oil cooling system of the class described, having hot oil delivery piping and cooled oil return piping, a heat exchange assembly having a cooler with an inlet port and an outlet port, and having a port to receive oil from the delivery piping, said ports being arranged in alignment substantially in the same plane in an upper exterior wall in said assembly, said heat exchange assembly having means for conducting a flow of cooling fluid therein and a means for regulating said flow of cooling fluid, the combination of: a housing having walls providing a unit inlet chamber for connection to said delivery piping, a cooler inlet chamber for connection to said cooler inlet, a cooler outlet chamber for connection to said cooler outlet, a passageway connecting said cooler inlet and cooler outlet chambers, a unit outlet chamber for connection to said return piping, at least one of the walls of each of said passageway and unit outlet chamber being an exterior wall of said unit, a first port between said unit inlet chamber and said unit outlet chamber, a second port between said cooler outlet chamber and said unit outlet chamber, the exterior wall of said unit outlet opening having a sealed opening opposite said second port; a check valve structure mounted in an exterior wall of said passageway having a normally open valve for closing said passageway, and a spring weighted piston responsive to excessive oil pressure in said passageway to move said valve to close said passageway; a check valve structure mounted in an exterior wall of said unit outlet chamber having a normally closed relatively heavily spring weighted valve for opening said first port in response to excessive pressure in said unit inlet chamber; a check valve structure mounted to be accessible through said sealed opening and having a relatively lightly spring weighted valve for closing said second port in response to a reversely acting pressure drop between said unit outlet chamber and said cooler outlet chamber; and a pressure drop control device for said regulating means supported in an exterior wall of said passageway and having conduit connections with said passageway upstream from said valve therein and with said unit outlet chamber.

GEORGE HERBERT GILL.